United States Patent
Kim et al.

(10) Patent No.: US 9,282,239 B2
(45) Date of Patent: Mar. 8, 2016

(54) APPARATUS AND METHOD FOR PHOTOGRAPHING PORTRAIT IN PORTABLE TERMINAL HAVING CAMERA

(71) Applicant: Samsung Electronics Co., Ltd., Suwon-si, Gyeonggi-do (KR)

(72) Inventors: Kyunghwa Kim, Seoul (KR); Seonhwa Kim, Seoul (KR); HeeJin Kim, Seoul (KR); Mijung Park, Hwaseong-si (KR); Seockhyun Yu, Seoul (KR); Joah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/142,290

(22) Filed: Dec. 27, 2013

(65) Prior Publication Data
US 2014/0192217 A1  Jul. 10, 2014

(30) Foreign Application Priority Data
Jan. 4, 2013 (KR) .................. 10-2013-0000988

(51) Int. Cl.
*H04N 5/232* (2006.01)

(52) U.S. Cl.
CPC ....... *H04N 5/23222* (2013.01); *H04N 5/23219* (2013.01); *H04N 5/23293* (2013.01); *H04N 5/23212* (2013.01); *H04N 5/23216* (2013.01)

(58) Field of Classification Search
CPC .......... H04N 5/23219; H04N 5/23222; H04N 5/23212; H04N 5/23216; H04N 5/23293

USPC ................... 348/222.1, 169, 333.04; 382/118
See application file for complete search history.

(56) References Cited

U.S. PATENT DOCUMENTS

| | | | | |
|---|---|---|---|---|
| 7,317,485 | B1* | 1/2008 | Miyake et al. | 348/333.02 |
| 2004/0207743 | A1* | 10/2004 | Nozaki et al. | 348/333.12 |
| 2008/0239104 | A1* | 10/2008 | Koh | 348/222.1 |
| 2009/0231457 | A1 | 9/2009 | Lee et al. | |
| 2010/0266206 | A1 | 10/2010 | Jo et al. | |
| 2011/0050976 | A1 | 3/2011 | Kwon | |
| 2011/0317031 | A1* | 12/2011 | Honda | 348/231.99 |
| 2012/0098992 | A1* | 4/2012 | Hosoe | 348/222.1 |

FOREIGN PATENT DOCUMENTS

| | | |
|---|---|---|
| GB | 2 448 221 A | 10/2008 |
| JP | 2009-65577 A | 3/2009 |
| KR | 10-0840023 B1 | 6/2008 |

* cited by examiner

*Primary Examiner* — Nhan T Tran
(74) *Attorney, Agent, or Firm* — Jefferson IP Law, LLP

(57) ABSTRACT

A method for photographing a portrait in an apparatus having a camera is provided. The method includes detecting a person in an image obtained by a camera in a photographing mode, determining occurrence of an error by identifying whether the detected person is located in a subject recognition area, generating an error warning including direction information so that the person moves into the subject recognition area if at least a portion of the person is out of the subject recognition area based on the determining of the occurrence of the error, and storing an image output by the camera if the person is located in the subject recognition area based on the determining of the occurrence of the error.

20 Claims, 17 Drawing Sheets

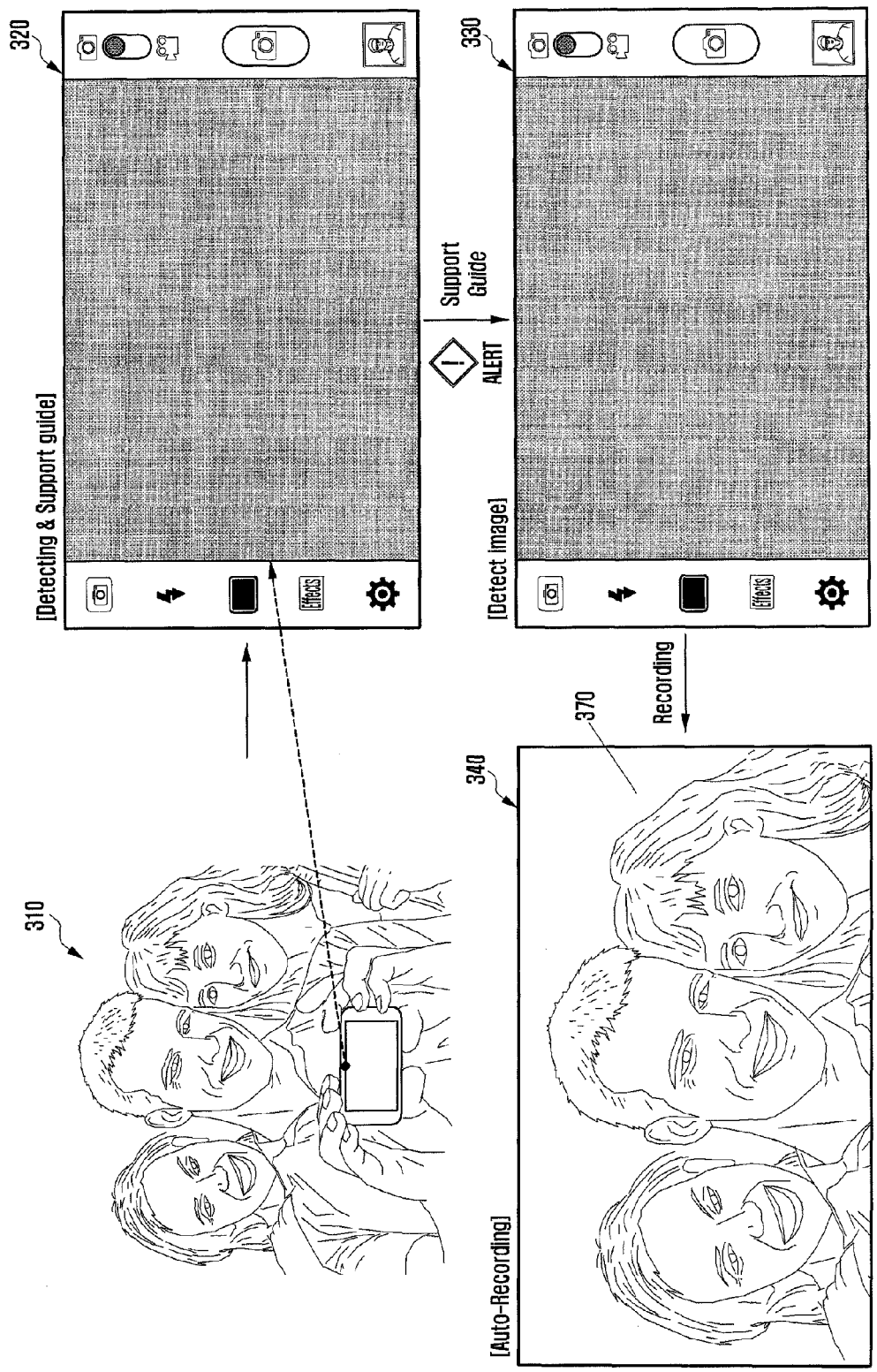

FIG. 4A

| | FIG. 4A |
|---|---|
| | FIG. 4B |

| PROVIDE PHOTOGRAPHING GUIDE | VOICE GUIDE | | | MEANING |
|---|---|---|---|---|
| | 1 PERSON DETECTED | 2 PERSONS DETECTED | 3 PERSONS DETECTED | MORE THAN 3 PERSONS DETECTED | |
| FACE DETECTED | One person is detected | 2 PERSONS ARE DETECTED. FOCUS ON LEFT (OR) RIGHT PERSON. | 3 PERSONS ARE DETECTED. FOCUS ON LEFT (OR) RIGHT (OR) CENTER PERSON. | N PERSONS ARE DETECTED. OR: TOTAL NUMBER OF PERSONS IN DETECTABLE AREA) | PROVIDE INFORMATION : NUMBER OF PERSONS DETECTABLE |
| FACE NOT DETECTED | | FACES ARE NOT DETECTED. (APPLIED IF FACE NOT DETECTED OR FACE NOT LOCATED IN A PREDETERMINED AREA) | | | |
| | | LEFT (OR/AND) RIGHT PERSON IS (ARE) STANDING OUT OF THE FRAME. TILT DOWN. (APPLIED IF 1 OR 2 PERSONS GENERATED ERROR) | LEFT, RIGHT, (OR/AND) CENTER PERSON IS (ARE) STANDING OUT OF THE FRAME. TILT DOWN. (APPLIED IF 1, 2, OR 3 PERSONS GENERATED ERROR) | | |
| LOWER PART OF FACE CUT OFF | TILT DOWN. | 1 PERSON ERROR: LEFT PERSON IS STANDING OUT OF THE FRAME. TILT DOWN | 1 PERSON ERROR: LEFT PERSON IS STANDING OUT OF THE FRAME. TILT DOWN | TILT DOWN. | LOWER PART OF IDENTIFIED PERSONAL FACE IS CUT OFF FROM SCREEN |
| | | 2 PERSONS ERROR: EVERY PERSON IS STANDING OUT OF THE FRAME. TILT DOWN. | 2 PERSONS ERROR: LEFT AND RIGHT PERSONS ARE STANDING OUT OF THE FRAME. TILT DOWN | | |
| | | | 3 PERSONS ERROR: EVERY PERSON IS STANDING OUT OF THE FRAME. TILT DOWN | | |
| UPPER PART OF FACE CUT OFF | TILT UP. | 1 PERSON ERROR: LEFT PERSON IS STANDING OUT OF THE FRAME. TILT UP. | 1 PERSON ERROR: LEFT PERSON IS STANDING OUT OF THE FRAME. TILT UP. | TILT UP. | UPPER PART OF IDENTIFIED PERSONAL FACE IS CUT OFF FROM SCREEN |
| LEFT PART OF FACE CUT OFF | MOVE LEFT. | 1 PERSON ERROR: LEFT PERSON IS STANDING OUT OF THE FRAME. MOVE LEFT. | 1 PERSON ERROR: LEFT PERSON IS STANDING OUT OF THE FRAME. MOVE LEFT. | MOVE LEFT. | LEFT PART OF IDENTIFIED PERSONAL FACE IS CUT OFF FROM SCREEN. |

| | MOVE RIGHT | 1 PERSON ERROR: LEFT PERSON IS STANDING OUT OF THE FRAME. MOVE RIGHT. | 1 PERSON ERROR: LEFT PERSON IS STANDING OUT OF THE FRAME. MOVE RIGHT. | MOVE RIGHT. | RIGHT PART OF IDENTIFIED PERSONAL FACE IS CUT OFF FROM SCREEN. |
|---|---|---|---|---|---|
| RIGHT PART OF FACE CUT OFF | | 2 PERSONS ERROR: LEFT AND RIGHT PERSONS ARE STANDING OUT OF THE FRAME. MOVE RIGHT. | | | |
| | | 3 PERSONS ERROR: EVERY PERSON IS STANDING OUT OF THE FRAME. MOVE RIGHT. | | | |
| FACE OUT OF AREA | TOO CLOSE | 1 PERSON ERROR: LEFT PERSON IS STANDING OUT OF THE FRAME. MOVE RIGHT. | 1 PERSON ERROR: LEFT PERSON IS STANDING OUT OF THE FRAME. MOVE RIGHT. | TOO CLOSE | PERSON LOCATED TOO CLOSE AND OUT OF PREDETERMINED AREA. |
| | | 2 PERSONS ERROR: EVERY PERSON IS STANDING OUT OF THE FRAME. TOO CLOSE. | 2 PERSONS ERROR: LEFT AND RIGHT PERSONS ARE STANDING OUT OF THE FRAME. TOO CLOSE. | | |
| | | | 3 PERSONS ERROR: EVERY PERSON IS STANDING OUT OF THE FRAME. TOO CLOSE. | | |
| SUBJECT/TERMINAL MOVING | HOLD YOUR POSE. | 1 PERSON MOVING: LEFT PERSON IS MOVING. HOLD YOU POSE. | 1 PERSON MOVING: LEFT PERSON IS MOVING. HOLD YOUR POSE. | HOLD YOUR POSE. | ALL SUBJECTS OR PORTION OF SUBJECTS MOVING |
| | | 2 PERSONS MOVING: HOLD YOUR POSE | 2 PERSONS MOVING: LEFT AND CENTER PERSONS ARE MOVING, HOLD YOUR POSE. | | |
| | | | 3 PERSONS MOVING: HOLD YOUR POSE. | | |
| EYES CLOSED | OPEN EYES. | 1 PERSON ERROR: LEFT PERSON IS STANDING OUT OF THE FRAME. OPEN EYES. | 1 PERSON ERROR: LEFT PERSON IS STANDING OUT OF THE FRAME. OPEN EYES. | OPEN EYES. | PERSON CLOSED EYES |
| | | 2 PERSONS ERROR: EVERY PERSON IS STANDING OUT OF THE FRAME. OPEN EYES. | 2 PERSONS ERROR: LEFT AND RIGHT PERSONS ARE STANDING OUT OF THE FRAME. OPEN EYES. | | |
| | | | 3 PERSONS ERROR: EVERY PERSON IS STANDING OUT OF THE FRAME. OPEN EYES. | | |
| CAMERA DEVICE INCLINED | | | TILT RIGHT (OR LEFT) | | |
| PERSONS CHANGED | | | NEW (OR REMOVED PERSONS) | | |
| CORRECTLY LOCATED | | | GOOD, HOLD YOUR POSE. | | |
| COUNTING | | | 3, 2, 1 (SAY CHEESE.) | | |

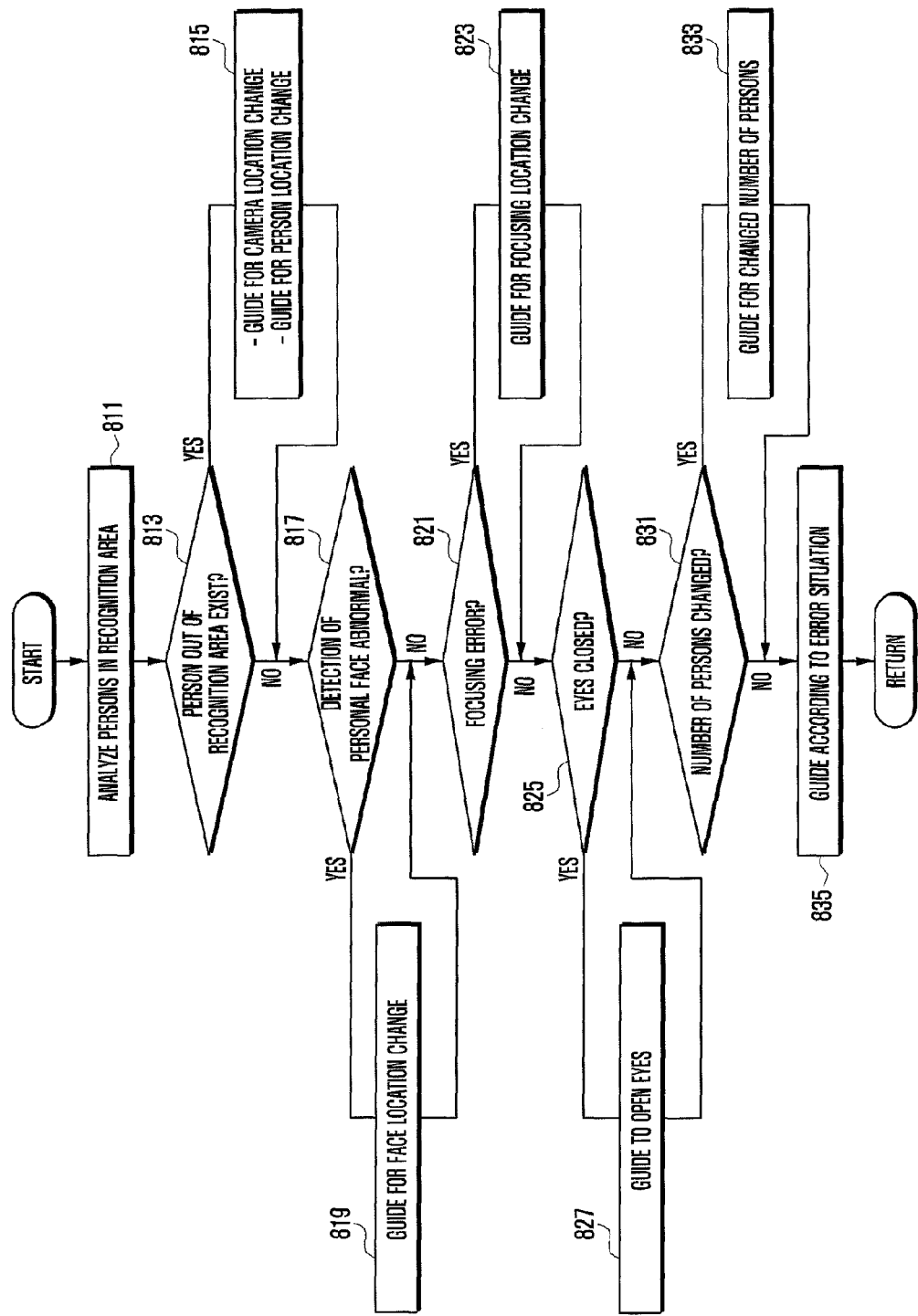

APPARATUS AND METHOD FOR PHOTOGRAPHING PORTRAIT IN PORTABLE TERMINAL HAVING CAMERA

CROSS-REFERENCE TO RELATED APPLICATION(S)

This application claims the benefit under 35 U.S.C. §119 (a) of a Korean patent application filed on Jan. 4, 2013 in the Korean Intellectual Property Office and assigned Serial No. 10-2013-0000988, the entire disclosure of which is hereby incorporated by reference.

TECHNICAL FIELD

The present disclosure relates to an apparatus and method for photographing in a portable terminal having a camera. More particularly, the present disclosure relates to an apparatus and method for photographing a portrait.

BACKGROUND

Generally, portable terminals having a camera device, which is typically implemented as a digital camera, can take various types of photographs by using the camera device. The camera device or portable terminal having a camera also includes a display unit and the camera is typically disposed on a side opposite to the display unit. Namely, in the digital camera device and/or portable terminal having a camera, the camera is disposed at the opposite side of a view finder and/or display unit (screen). In the case of a portable terminal having a dual camera, a first camera (i.e., front camera) disposed at the same side as the display unit has a lower resolution as compared to a second camera (i.e., rear camera) disposed at the opposite side of the display unit. Namely, the rear camera has higher resolution as compared to the front camera.

In camera devices or portable terminals having a camera as described above, if a photographer takes a photo looking at the camera (e.g., self-shot) or looking at the rear camera in the portable terminal having a dual camera, the photographer cannot look at the display unit. In this case, the photographer cannot correctly identify the composition of the subject photographed by the camera, because the photographer cannot look at the display unit or view finder, and thereby cannot identify if an error occurs. For example, when taking a portrait, various errors may occur such as a subject of the image, namely a person, may stand out of the photographing composition or the subject may only be partially photographed.

Further, in various cases in which the photographer takes a photo by holding the camera upwards, by holding the camera downwards, or by directly looking at the subject, the eyes of the photographer are in the same direction as the display unit. However, the photographer cannot look at the display unit. In this case, the photographer cannot identify if an error occurs, even though the subject is out of the photographing composition, is only partially photographed, etc.

Accordingly, a need exists for an improved apparatus and method for photographing a subject in a composition desired by a photographer in a situation in which the photographer cannot look at a display unit (i.e., screen) in a camera device or portable terminal having a camera.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides an apparatus and method for photographing a subject in a composition desired by a photographer in a situation in which the photographer cannot look at a display unit (i.e., screen) in a camera device or portable terminal having a camera. For this, the camera device or portable terminal having a camera according to an embodiment of the present disclosure identifies a subject and feedback information regarding the composition of subject to the photographer by analyzing the identified subject so that the photographer can take an errorless photo in a situation that the photographer cannot see the subject.

In accordance with an aspect of the present disclosure, a method for photographing a portrait in an apparatus having a camera is provided. The method includes detecting a person in an image obtained by a camera in a photographing mode, determining occurrence of an error by identifying whether the detected person is located in a subject recognition area, generating an error warning including direction information so that the person moves into the subject recognition area if at least a portion of the person is out of the subject recognition area based on the determining of the occurrence of the error, and storing an image output by the camera if the person is located in the subject recognition area based on the determining of the occurrence of the error.

In accordance with another aspect of the present disclosure, an apparatus having a camera is provided. The apparatus includes a display unit configured to be disposed on an opposite side of the camera and to display an image photographed by the camera, a storage unit configured to store error warnings corresponding to error types and to store photographed images, and a control unit configured to determine whether a person is located in a subject recognition area of the image output by the camera in a photographing mode, to generate an error warning including direction information so that the person moves into the subject recognition area if at least a portion of the person is not located in the subject recognition area, and to store the image output by the camera if the person is located in the subject recognition area.

When taking a self-portrait by using a rear camera to obtain a high resolution image in a camera device or portable terminal having a camera, a photographer may identify, by using an audio error warning, whether a photographing composition is correctly set even without looking at an image photographed by the camera, and thereby a portrait image having a desired photographing composition can be obtained. Even when the photographer takes a photo without looking at the display unit, movement of the camera or the subject can be identified through voice guide information, and thereby the photographer can take a portrait photo in various postures. Further, an auto-portrait photographing method according to an embodiment of the present disclosure provides an improved method of photographing for a person who cannot identify a subject, such as a blind person, or in a situation that the subject cannot be identified.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a drawing illustrating states of a camera device while executing the procedure of FIG. 2 according to an embodiment of the present disclosure;

FIGS. 4A and 4B are drawings illustrating examples of an error warning while photographing a subject according to the procedure of FIG. 2 according to an embodiment of the present disclosure;

FIG. 8 is a flowchart illustrating a procedure of outputting an error type and an error warning according to the error type by analyzing a person in an image photographed by the procedure of FIG. 5 according to an embodiment of the present disclosure;

Throughout the drawings, it should be noted that like reference numbers are used to depict the same or similar elements, features, and structures.

DETAILED DESCRIPTION

Figure 1:
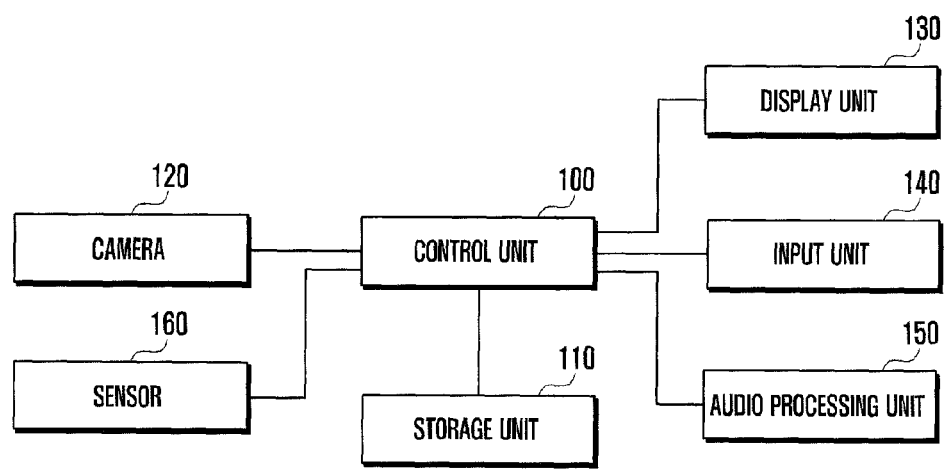
FIG. 1 is a block diagram illustrating a configuration of camera device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "photographing mode" denotes a mode for identifying an error by analyzing a subject and adjusting a composition by moving the subject or camera if the error is generated. In an embodiment of the present disclosure, the "photographing mode" will be used to denote the same meaning as an "auto-portrait mode". The term "error" will be generally used for a case in which a subject is out of a photographing screen, a human subject has their eyes closed, a face of a human subject is not detected, or focusing of the human subject is not correctly performed. Further, the term "error warning" denotes a warning used to set a subject in a desired composition by guiding a photographer and/or human subject to move if an error is generated. The term "recognition area" denotes an area of a screen for identifying a subject.

When photographing a subject with a camera device or with a portable terminal having a camera, a user may use either of the following two methods. A first method is to photograph a subject after evaluating the image being photographed by using a display unit or a view finder. Another method is to photograph a subject that is located in the direction of the camera, such as when taking a self-portrait, or to photograph a subject without looking at the view finder or the display unit. In the latter case, the user cannot identify whether the subject is photographed in a desired composition. Therefore, in the latter case, the camera device or the portable terminal having a camera must warn of an error by determining a composition of the subject being photographed, and guide a photographer to operate the camera device or the portable terminal according to the error warning or to move the subject so that the photo can be taken in a desired composition. Here, the subject may be a person.

A camera device and a portable terminal having a camera according to an embodiment of the present disclosure detects the number of persons through the camera in a photographing mode, identifies whether an error is generated from the detected persons, and indicates an error warning to remove the corresponding error in an audio, video, and/or vibration form, if the error is generated. According to the error warning, a photographer can operate the camera device or adjust a photographing composition by moving the human subjects. For this, the camera device and the portable terminal having a camera repeats the above operation, and obtains an image by performing the photographing mode if persons are located in a desired photographing composition.

FIG. 1 is a block diagram illustrating a configuration of a camera device according to an embodiment of the present disclosure.

Referring to FIG. 1, a camera 120 performs a function of photographing an image according to a camera drive command.

A control unit 100 controls the general operation of the camera device. According to an embodiment of the present disclosure, the control unit 100 detects persons in a recognition area in a photographing mode, identifies whether the detected persons are located in the recognition area and in a desired or otherwise acceptable composition, generates an error warning if an error is generated because the persons are not located as desired, and controls the photographing operation if the persons are located in the recognition area and in the desired or otherwise acceptable composition.

A storage unit 110 may include a program memory configured to store a camera operation program according to embodiments of the present disclosure, and a data memory configured to store photographed images. The storage unit 110 may further store error warnings corresponding to error types detected in the photographing mode according to embodiments of the present disclosure. Here, the error warning may be audio and/or video guide information.

A display unit 130 displays an image being photographed and photographing information under the control of the control unit 100, and displays an error warning according to embodiments of the present disclosure. The display unit 130 may be configured with a Liquid Crystal Display (LCD), an Organic Light Emitting Diode (OLED), and the like. An input unit 140 generates input signals for the control of the camera device. An audio processing unit 150 outputs an error warning according to an error type detected in the photographing mode with an output signal of a voice and/or a sound under the control of the control unit 100. A sensor 160 detects a state of the camera position. Here, the sensor 160 may be configured with one or more of an acceleration sensor, a gyro sensor, an altitude sensor, and the like. The sensor 160 detects the state of the camera such as inclination, and outputs state information to the control unit 100.

In the camera device having the above configuration, a user may set a photographing mode through the input unit 140. Here, the photographing mode may be an auto-portrait mode as described above, and may be set in a setting mode. In the settings of the photographing mode, the auto-portrait mode may be switched on or off. The error warning may be selected from a video error warning, an audio error warning, and a vibration error warning. Further, in the photographing mode according to embodiments of the present disclosure, a recognition area of a human subject may be set. The recognition area may be set as a default or set by the user through the input unit 140.

Depending on the state of the photographing mode (i.e., auto-portrait mode: on), the control unit 100 receives an image photographed by the camera 120, detects persons in the recognition area of the image, and determines whether the persons are photographed in the recognition area without error. Here, the error may include a case in which a person is abnormally located in the recognition area (e.g., a portion of the person's face and/or body is out of the recognition area), a case in which a face of person is not correctly detected (e.g., face down), a case in which the person's eyes are closed, and a case in which the person is out of focus. Further, the control unit 100 receives information regarding inclination of the device from the sensor 160, and may generate an error warning to correct the inclination if the device is inclined more than a threshold value. The control unit 100 accesses an error warning stored in the storage unit 110 according to the detected error type, and controls the display unit 130 and/or audio processing unit 150 to output the error warning. The error warning is guide information to correct an error situation, and may guide to adjust the camera device or to move a human subject.

Figure 2:
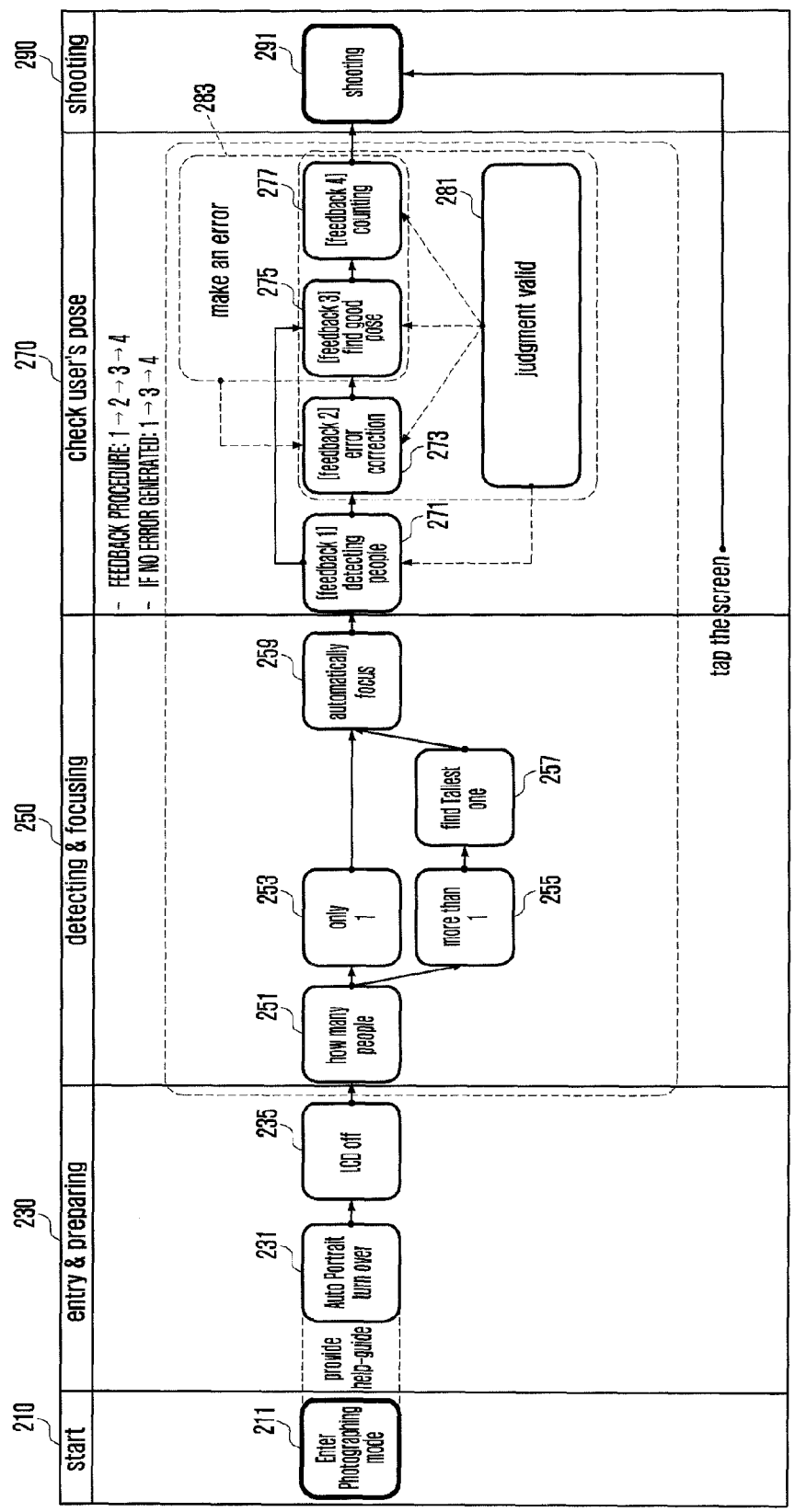
FIG. 2 is a drawing illustrating a procedure of photographing a subject in a camera device or a portable terminal having a camera according to an embodiment of the present disclosure.

FIG. 2 is a drawing illustrating a procedure of photographing a subject in a camera device or a portable terminal having a camera according to an embodiment of the present disclosure. FIG. 3 is a drawing illustrating states of a camera device while executing the procedure of FIG. 2 according to an embodiment of the present disclosure. FIGS. 4A and 4B are drawings illustrating examples of an error warning while photographing a subject according to the procedure of FIG. 2 according to an embodiment of the present disclosure.

Embodiments of the present disclosure relate to a method for photographing a portrait in a camera device or a portable terminal having a camera. Generally, the method for photographing a portrait is divided into a method for photographing in which a photographer takes a photo by looking at a subject and another method for photographing in which the photographer takes his/her own photo by looking at a camera lens (hereafter, auto-portrait mode). In the auto-portrait mode, the photographer cannot identify an image being photographed by using a view finder or display unit. In this case, the photographer cannot determine whether the subject is photographed in a desired composition (i.e., whether a human subject is correctly located in a screen). Accordingly, the subject can be photographed in an undesired composition (i.e., erroneous state) in the auto-portrait mode. The camera device according to embodiments of the present disclosure identifies a person to be photographed in the auto-portrait mode, and determines generation of an error by analyzing the identified person. If an error is generated, the camera device generates an error warning (e.g., a voice guide) and provides feed back to the photographer. If no error is generated, the camera device outputs a message that photographing (e.g., automatic photographing) is acceptable. FIG. 2 is a drawing illustrating a procedure of photographing a subject in a camera device or a portable terminal having a camera according to an embodiment of the present disclosure.

Referring to FIG. 2, in starting block 210, if the photographer requests to operate the camera through the input unit 140, the control unit 100 activates the camera 120 by entering the photographing mode at operation 211. At this time, the control unit 100 proceeds to entry and preparing block 230 and controls the display unit 130 to display a photographing guide (i.e., help guide). The photographing guide for a photographer may include an auto-portrait mode. After activating the camera 120, if the camera device is turned over, the control unit 100 can identify that the lens of the camera 120 is directed towards the photographer. Accordingly, if the user selects an auto-portrait mode or the turn-over operation is detected, the control unit 100 sets the auto-portrait mode at operation 231, and turns the display unit 130 off at operation 235. After setting the auto-portrait mode, the control unit 100 proceeds to detecting and focusing block 250 and performs an operation of detecting persons in the recognition area and focusing on the persons. The control unit 100 detects the number of persons identified through the camera 120 at operation 251, determines whether the number of detected persons is one or more than one at operations 253 and 255, and outputs the result through the audio processing unit 150 with a voice guide. If more than one person is detected, the control unit 100 can search for the tallest person from the detected persons at operation 257. In an embodiment, operation 257 may be skipped. After detecting the number of persons in the recognition area, the control unit 100 controls the camera 120 to focus on the persons at operation 259. Here, the focusing may be performed on a face of person (e.g., eyes, cheek, etc.) or on the tallest person if operation 257 is performed. Further, if more than one person is detected in the recognition area at operation 251, the control unit 100 may decide to focus on the person having a larger face area by comparing the identified face areas (i.e., rectangular area) at operation 259. Subsequently, the control unit 100 proceeds to checking user's pose block 270 and may generate an error warning or guide a photographing procedure by analyzing the states of detected persons. The control unit 100 detects persons in the recognition area at operation 271, and determines whether the persons in the recognition area are in a normal posture state by using a judgment value at operation 281. Subsequently, if an error is detected at operation 273, the control unit 100 outputs an error warning (e.g., a voice guide) corresponding to the error detected at operation 273, and if the persons move according to the error warning, the control unit 100 performs an error correction at operation 281, and provides feed back to the photographer at operation 273. Examples of error types are listed in FIGS. 4A and 4B, and the error types detected at operations 271 and 273 or the result of error correction may be guided with a voice. Here, the error type may include a case in which the upper, lower, left, or right portion of a face is cut off, a case in which the face is out of the recognition area, a case in which a human subject or the camera device moved, a case in which the human subject has their eyes closed, a case in which the camera device is inclined (i.e., not leveled in the horizontal direction), or a case in which a face of a person or the number of persons in the recognition area changes. The decision that there has been a change of a person may be made if the size of person changes more than about 50% based on a focused person or if the number of persons in the recognition area changes due to a person passing by. If an error situation is addressed according to the error warning (i.e., error correction) or if an error is not detected, the control unit 100 notifies that no error exists at operation 275, guides a photographing operation 277, proceeds to shooting block 290, and performs auto-portrait photographing after terminating the guide operation (i.e., automatic photographing) at operation 291. If an erroneous situation is generated at operation 275 or 277, the control unit 100 detects it at operation 283, and performs an error warning procedure by returning to operation 271. Further, in a state in which an error is fed back based on the analyzing of postures of persons in the recognition area (i.e., at operations 271 to 277), if the photographer presses a shutter button of the input unit 140 or taps the screen of display unit 130, the control unit 100 performs a photographing operation by proceeding to operation 291 regardless of the error generation (i.e., manual photographing). If a threshold time is elapsed (i.e., after N seconds) while no movement of identified persons and terminal is detected, the control unit 100 can perform an automatic photographing operation. Here, the decision on the movement of persons may be performed based on an image analyzing technology, and the terminal is identified to be in a stable state if no movement is detected through the sensor 160 (e.g., an acceleration sensor, a gyro sensor, etc.). FIG. 3 is a drawing illustrating states of a camera device and a photographer in an auto-portrait photographing. After activating the camera 120, if the photographer sets an auto-portrait mode in the photographing mode or turns over the terminal as shown by 310, the control unit 100 detects it and turns the display unit 130 off (i.e., black screen) as shown by 320. Subsequently, the control unit 100 detects and analyzes persons in an image obtained by the camera 120, and transmits a feedback so that a face remains in a recognition area. In the state of transmitting the feedback, the control unit 100 turns the screen of the display unit 130 off as shown by 330. In the state of 330, the control unit 100 analyzes an error in the recognition area, and the range classified into errors may be a case in which a face is out of the recognition area, a case in which a person's eyes are closed, a case in which a face of a person is not identified (e.g., a turn of the face sideward or down, etc.), a case in which a face is not correctly focused, and/or the number of faces or the number of persons has changed. If the error is corrected in the state of feeding back an error warning as shown in 4A and 4B, the control unit 100 controls the camera 120 to maintain a focusing state for a threshold time, feeds back the automatic photographing state with a voice, and takes a photo of the identified persons 370 as shown by 340. Alternatively, if the photographer's request for photographing (i.e., pressing a shutter button, tapping the screen, etc.) is detected in the state of displaying an error warning, the control unit 100 performs a photographing mode as shown by 340.

Figure 5:
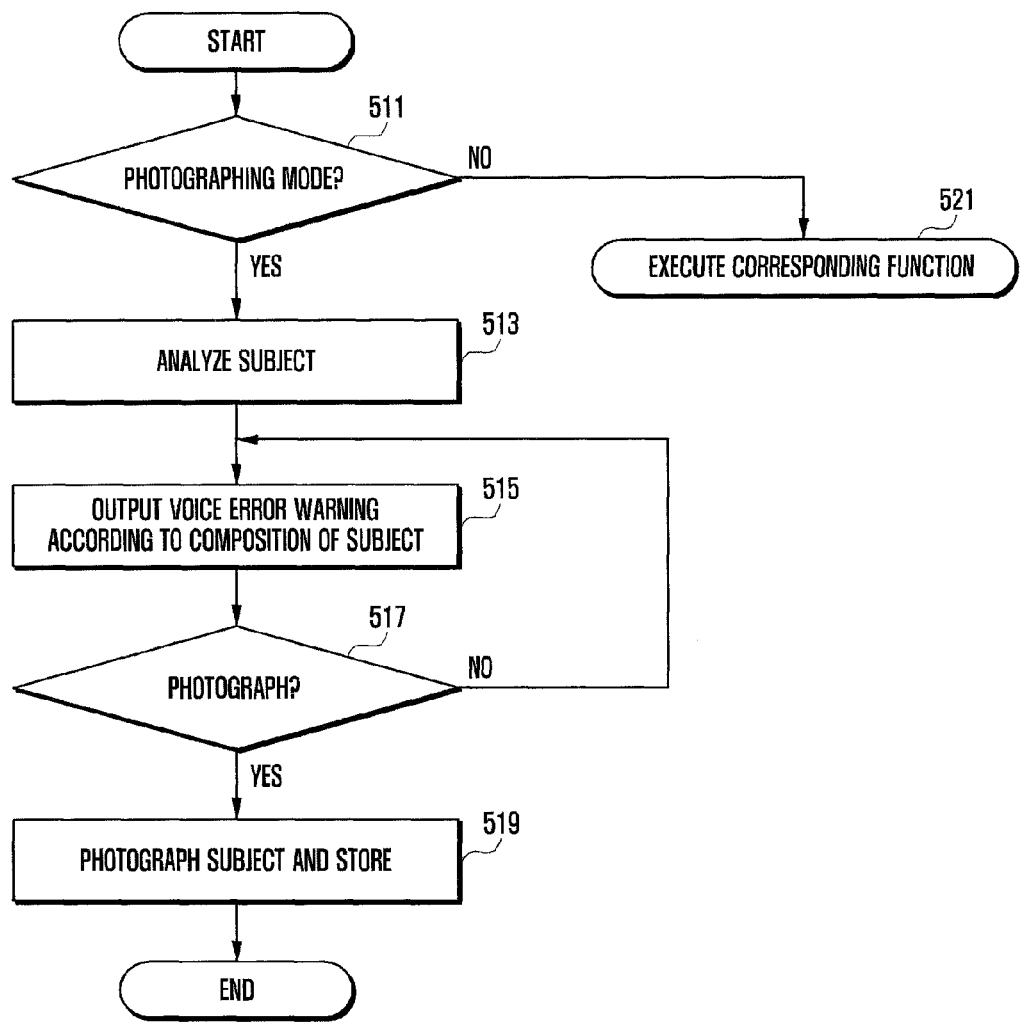
FIG. 5 is a flowchart illustrating a procedure of executing a photographing mode (i.e., smart photographing mode) in a camera device according to an embodiment of the present disclosure.
Figure 6A:
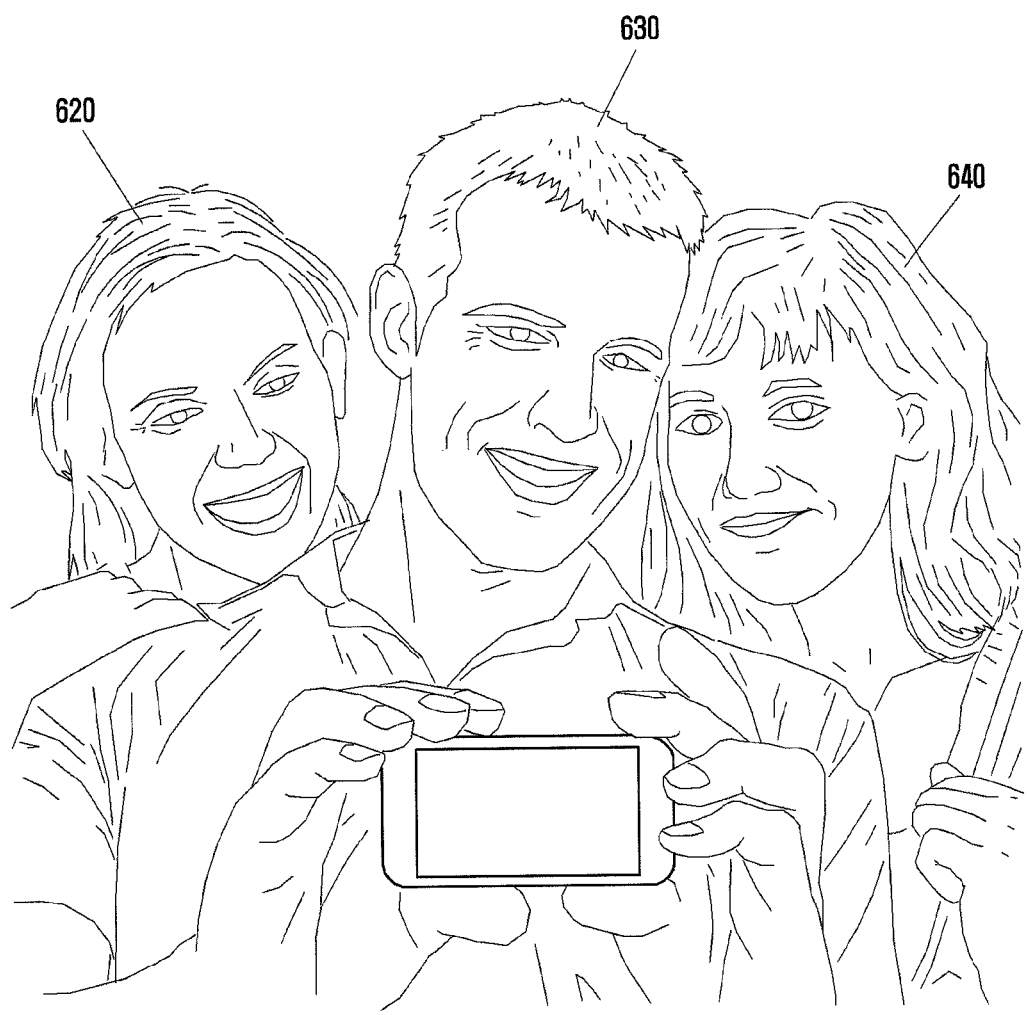
FIGS. 6A, 6B, 6C and 6D are drawings illustrating a procedure of outputting an error warning by detecting an error in a photographing mode and storing an image photographed by a camera device according to an embodiment of the present disclosure.
Figure 6B:
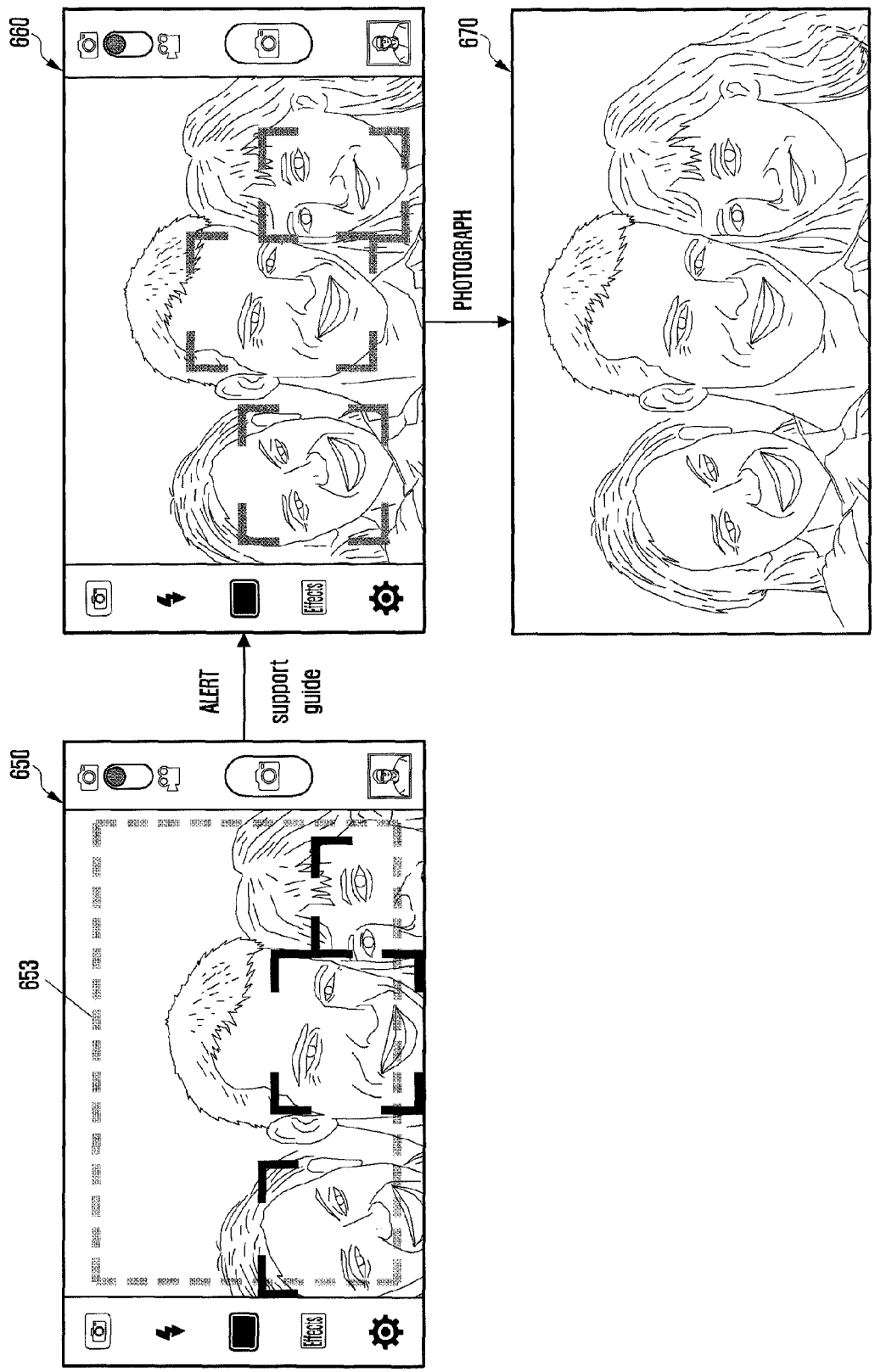
Figure 6C:
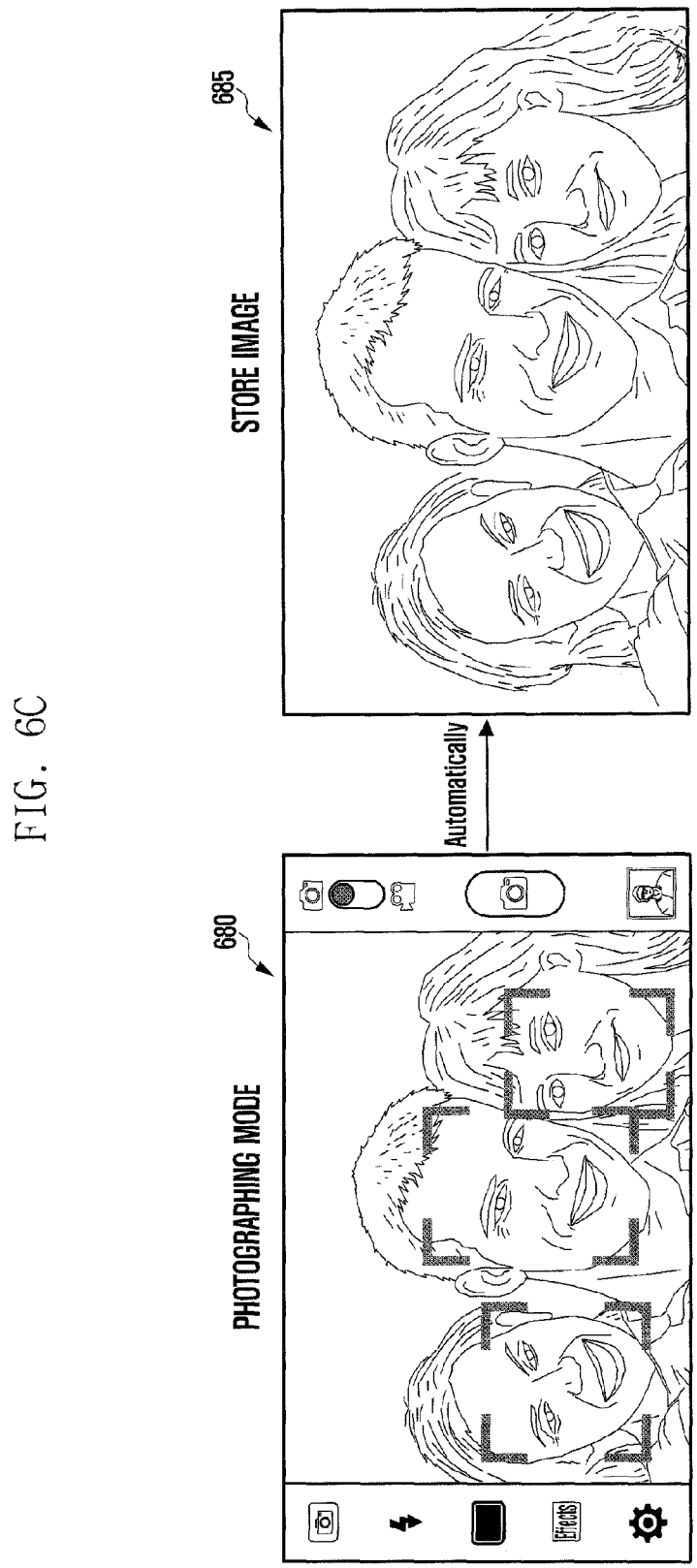
Figure 6D:
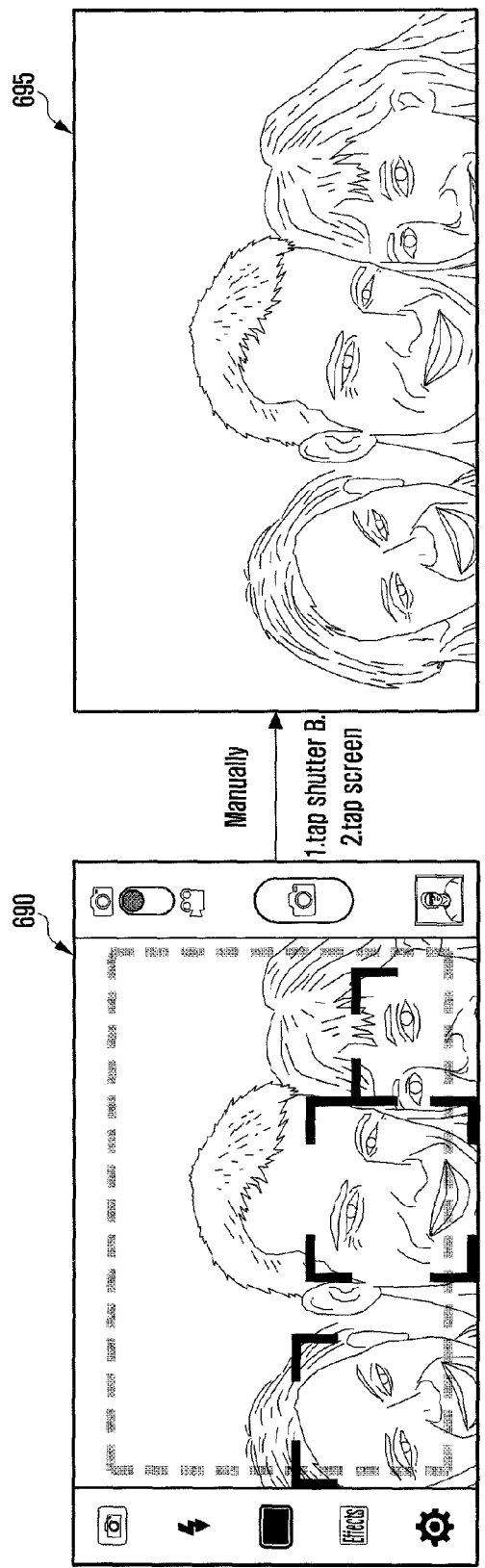

FIG. 5 is a flowchart illustrating a procedure of executing a photographing mode (i.e., automatic photographing mode) in a camera device according to an embodiment of the present disclosure;

FIGS. 6A to 6B are drawings illustrating a procedure of outputting an error warning by detecting an error in a photographing mode of a camera device according to an embodiment of the present disclosure. FIGS. 6C and 6D are drawings illustrating a procedure of storing an image photographed by a camera device according to an embodiment of the present disclosure.

Referring to FIGS. 5 and 6A to 6D, the photographer may activate the camera 120 and set a portrait photographing mode (auto-portrait mode: on) in a setting mode according to an embodiment of the present disclosure. Alternatively, the photographer may set the portrait photographing mode (auto-portrait mode: on) in the setting mode according to an embodiment of the present disclosure and drive the camera 120. Here, the portrait photographing mode may be set by a toggle switch, and thereby the portrait photographing mode (i.e., auto-portrait mode) according to an embodiment of the present disclosure is maintained if set once. If the user requests to drive the camera 120 through the input unit 140, the control unit 100 detects it and activates the camera 120, and determines whether the portrait photographing mode (i.e., auto-portrait mode) is switched on at operation 511. If the person photographing mode is switched off, the control unit 100 executes a corresponding function at operation 521.

Here, the portrait photographing mode may be an auto-portrait mode, and the auto-portrait mode may be used when a user 630 photographs himself and two other persons 620 and 640 by photographing without looking at a view finder or the display unit 130 as shown in FIG. 6A. For example, in a case in which the photographer photographs an image without looking at the view finder or display unit 130 (i.e., a self-shot, a self-portrait, or when the photographer takes a photo looking at a human subject), the portrait photographing mode (i.e., auto-portrait mode) according to an embodiment of the present disclosure can be used.

If the photographing mode is identified to be switched on at operation 511, the control unit 100 analyzes a subject in the recognition area of an image being photographed by the camera 120 at operation 513. Here, the subject may be a person, and the control unit 100 detects a face of the person from the identified subject. For a face recognition method, an algorithm of the related art may be used. Generally, the face recognition may be performed by a process of extracting a face area in which a face is distinguished from the whole image and a process of determining whose face is the distinguished face. In order to distinguish a face from the surroundings, the extraction of the face area may use information such as brightness, movement, color, and estimation of eye location. For a correct extraction of the face area, the control unit 100 may extract the face area by combining more than one kind of information. Alternatively, the process of face recognition may use a method of identifying a face by using shapes of major parts of the face such as eyes, nose, and mouth, and distances between them. The face recognition method may be used to identify a human subject. Namely, if a new face image is obtained in a state of having a plurality of face images, the camera device can identify a photographed person by comparing a pixel value of the obtained face image with those of reserved images. There are various methods for recognizing a face, and a Principal Component Analysis (PCA) is most frequently being used, which is a principal component analysis in the mathematical technique.

If a human subject is detected from an image photographed at operation 513, the number of detected persons and locations of persons in the subject recognition area are analyzed and corresponding feedback information is output at operation 515. Namely, after analyzing the image obtained by the camera 120, the control unit 100 controls to indicate the number of persons detected from the image by outputting an audio, video, or audio/video, and to determine whether persons in the photographed image are normally located in the recognition area. Because the photographing is performed in the state shown in FIG. 6A, the photographer 630 cannot identify the image being photographed by the camera 120. Accordingly, the control unit 100 identifies an error by analyzing the image photographed in the photographing mode if the persons are located in the subject recognition area 653 in an undesired composition as shown by 650 of FIG. 6B.

Here, the subject recognition area set as shown by 653 of FIG. 6B denotes an area in which the control unit 100 identifies a subject in the photographing mode and determines whether the identified subject is a human. The subject recognition area may be a systematically preset area (i.e., an area set as default) or an area set by the user in the setting mode. Further, the subject recognition area may be a simple basic figure (e.g., a rectangle) as shown by 653 of FIG. 6B or a complex figure indicating a person, scenery, an object, and the like. In analyzing the subject, the error may be generated if a portion of a face and/or a body is cut off from the subject recognition area, if a person in the subject recognition area turns their face to the side or downwards (i.e., if eyes, nose, or mouth is not identified), if focusing is made on any other location than a face, and/or if the person in the subject recognition area has their eyes closed.

If an error is detected in the subject recognition area, the control unit 100 displays an error warning corresponding to an error situation retrieved from the storage unit 110. The error situation may be, as described above, a case in which a portion of the face and/or body is out of the subject recognition area, a case in which a face is not identified, a case in which focusing is not made on a person, or a case in which a person has their eyes closed. If an error situation is detected at operation 515, the control unit 100 accesses the storage unit 110 to retrieve an error warning corresponding to the detected error, and outputs an error warning through the display unit 140 and/or audio processing unit 150. Here, the display unit 140 may use a display device (e.g., a blinking lamp, etc.) disposed in the same direction as the camera 120 or a vibration indicator. Here, the error warning corresponding to the error type may be set as shown in FIGS. 4A and 4B. FIGS. 4A and 4B mainly show error warnings recommending a camera operation or movement of a human subject.

If the photographer moves the camera device or the human subject moves according to the error warning, the control unit 100 identifies that the persons in the subject recognition area of the image obtained by the camera 120 are located in a desired or acceptable composition as shown by 660 of FIG. 6B. If the persons in the subject recognition area are identified to be located normally, the control unit 100 guides the photographer with a voice. The photographer may then touch the screen or press the shutter button of the input unit 140, and the control unit 100 detects it at operation 517, and stores an image in the storage unit 110 as shown by 670 of FIG. 6B at operation 519. Alternatively, if the persons in the subject recognition area are identified to be located normally as shown by 660 of FIG. 6B, the control unit 100 may detect it at operation 517, and automatically execute operation 519 (auto recording).

Here, the photographing may be performed in an automatic photographing mode or a manual photographing mode. If a threshold time (i.e., N seconds) is elapsed in a normal state (i.e., an errorless state), the automatic photographing mode stores the photographed image in the storage unit 110. Namely, the control unit 100 indicates that no error exists (i.e., voice guide of errorless state) if all the persons in the subject recognition area are located normally at operation 515 as shown by 680 of FIG. 6C, identifies a normal photographing state at operation 517 if a threshold time is elapsed, and stores an image at operation 519 as shown by 685 of FIG. 6C. If the automatic photographing mode is switched on and an errorless image is identified as shown by 680 of FIG. 6C, the control unit 100 may guide with a voice that a photo will be taken after N seconds. If the user generates a photographing command through the input unit 140 before reaching N seconds while guiding the errorless state having a normal composition, the control unit 100 detects it at operation 517 and stores the corresponding image at operation 519.

If an erroneous image is identified as shown by 690 of FIG. 6D, the control unit 100 outputs an error warning corresponding to the error type identified at operation 515. Here, the error warning may include voice guide information, and in the case of 690 of FIG. 6D, the control unit 100 may generate an error warning guiding to tilt down the camera device at operation 515 as shown in FIGS. 4A and 4B. However, if the user generates a photographing command through the input unit 140 in an erroneous state, the control unit 100 detects it at operation 517, and stores an image in the storage unit 110 at operation 519 as shown by 695 of FIG. 6D. This is to allow the user to store an image even though an error is generated in the image. The photographing command generated through the input unit 140 may be an input of a shutter button (i.e., by tapping the shutter button), and if the input unit 140 is a touch panel, the photographing command may be generated by touching (tapping) any position in the screen of the display unit 130.

Figure 7:
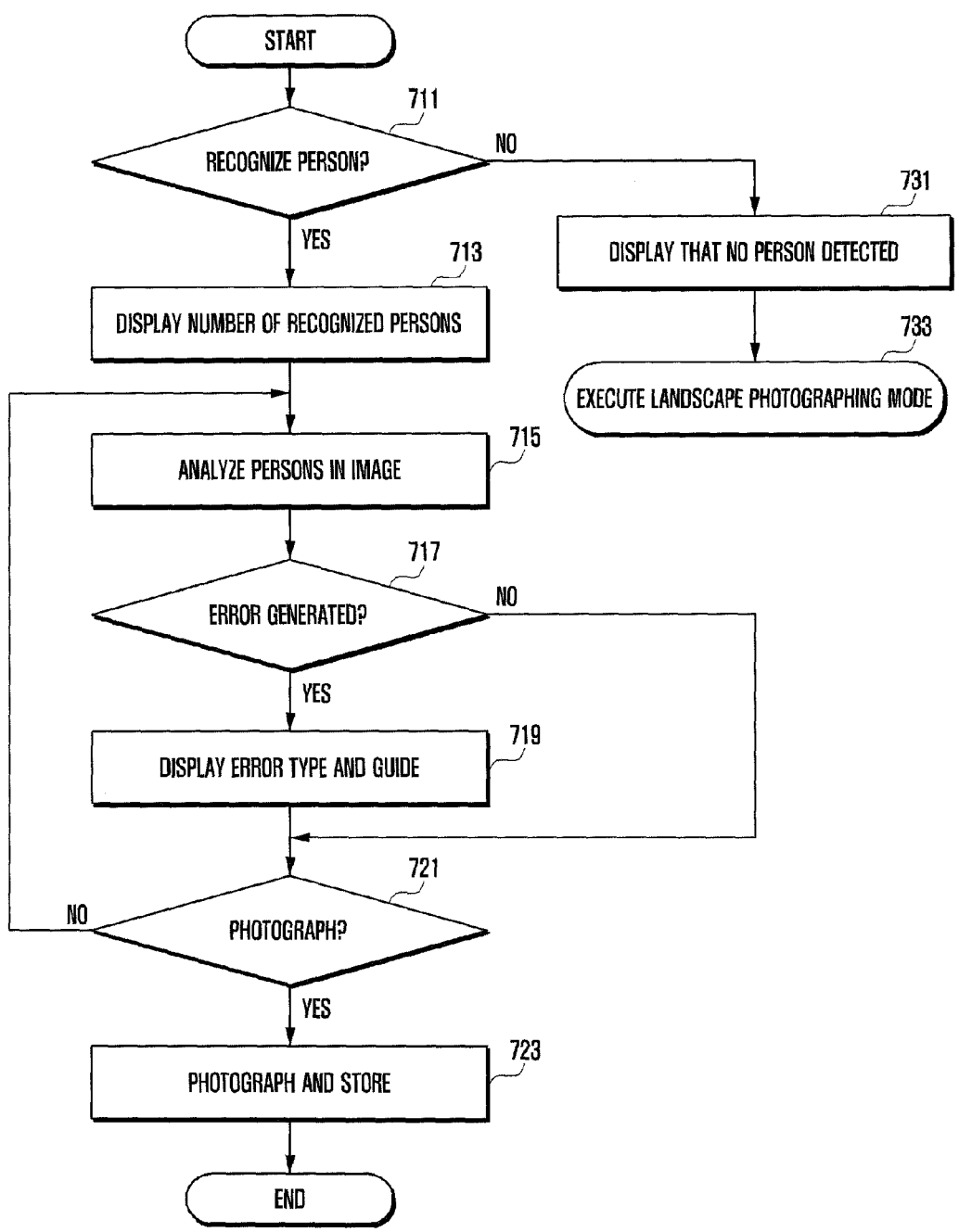
FIG. 7 is a flowchart illustrating a procedure of photographing a portrait in a camera device according to an embodiment of the present disclosure.

FIG. 7 is a flowchart illustrating a procedure of photographing a portrait in a camera device according to an embodiment of the present disclosure.

Figure 9A:
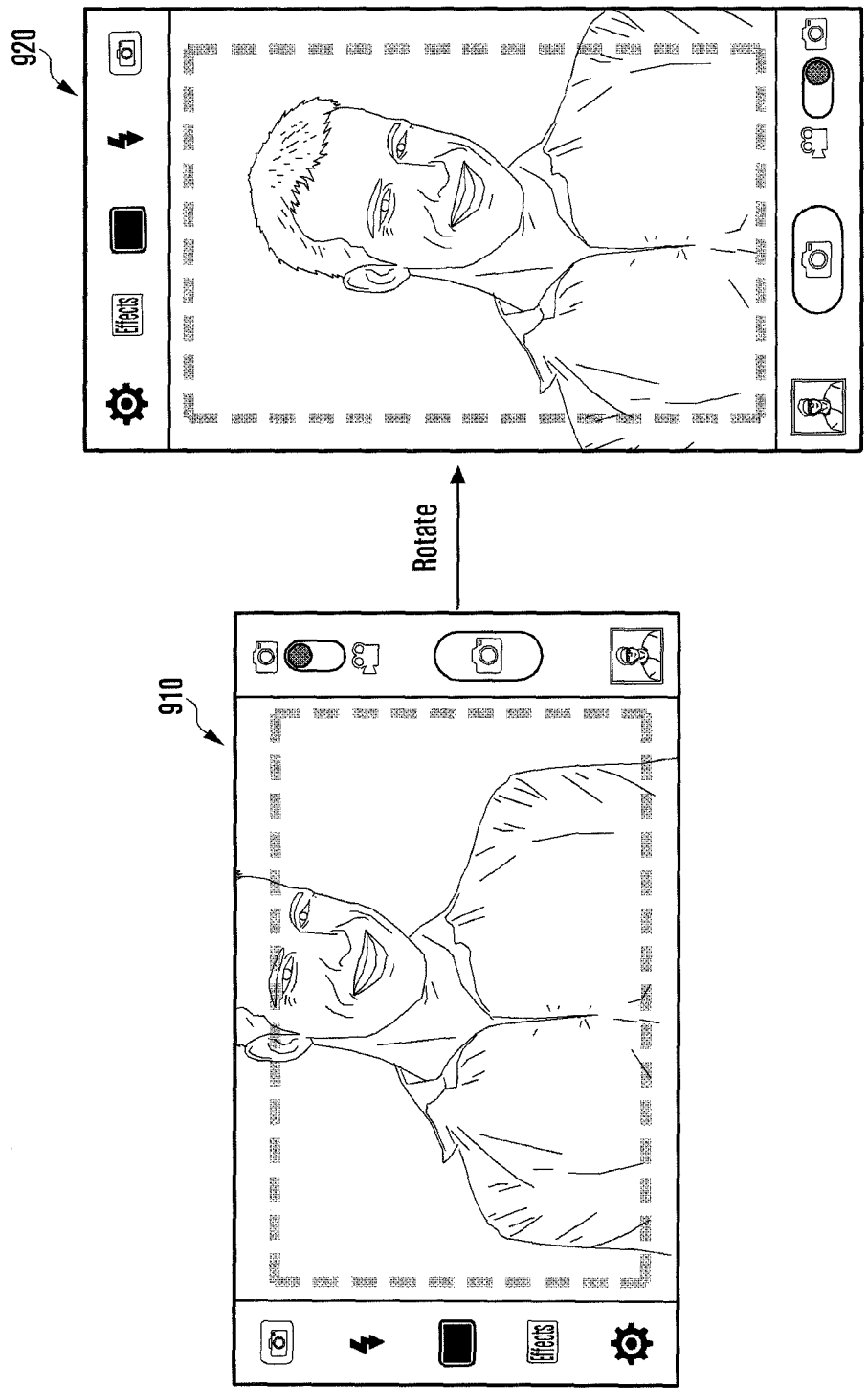
FIGS. 9A and 9B are drawings illustrating examples of an image photographed by a camera device according to an embodiment of the present disclosure.
Figure 9B:
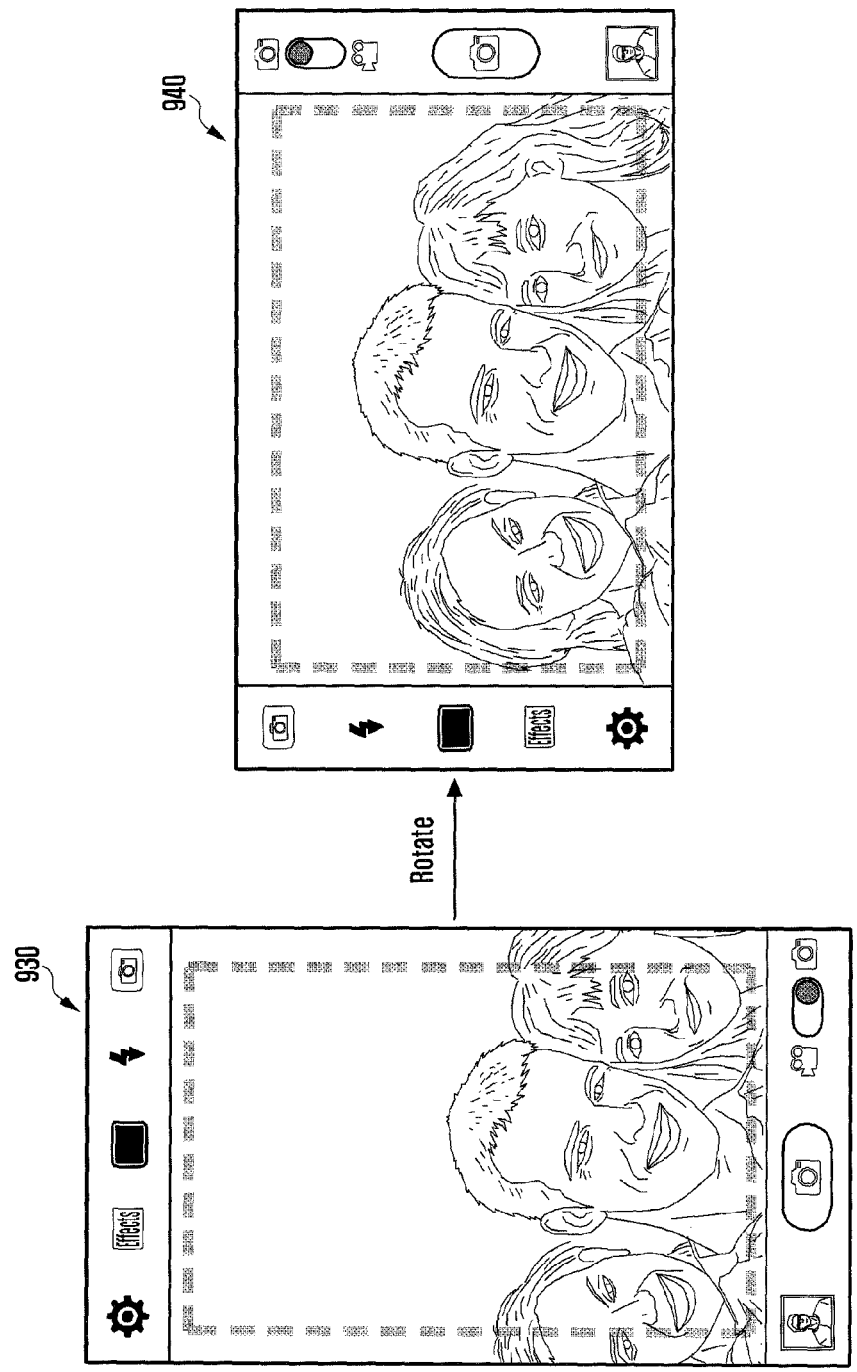

Namely, FIG. 7 is a flowchart illustrating a procedure of photographing a portrait at operations 513 and 515. FIG. 8 is a flowchart illustrating a procedure of outputting an error type and an error warning corresponding to the error type by analyzing persons in an image photographed in FIG. 7. FIGS. 9A and 9B are drawings illustrating display examples of an image photographed by a camera device. Further, FIGS. 7 and 8 may be explained referring to FIGS. 6A to 6D. The display of the camera device such as an error warning may be output in a form of audio, video, vibration, or audio/video, and the following description will be made based on the audio (i.e., voice guide) output.

The method for photographing a portrait of FIGS. 7 and 8 according to an embodiment of the present disclosure is described referring to FIGS. 6C, 6D, 9A, and 9B. Firstly, the control unit 100 determines whether a person exists in a photographed image at operation 711. Here, the determining of the person may be performed by using a method of detecting a face area. If a face area is not extracted or recognized in the image, the control unit 100 detects it at operation 711 and indicates that no person exists in the image at operation 731. For example, if a face is not recognized, the control unit 100 may display "Face is not detected" or "Nobody in here". In this case, the control unit 100 provides a landscape photographing mode at operation 733, and if a person is detected in the image, the control unit 100 performs a portrait photographing mode. In an embodiment of the present disclosure, it is assumed that the control unit 100 proceeds to operation 733 and performs a general photographing mode, if a person is not included in the image.

If a face is recognized in an image output by the camera 120, the control unit 100 detects it at operation 711, and displays the number of identified persons at operation 713. Here, the number of identified persons may be indicated with a voice. For example, when recognizing faces, the control unit 100 may display "N person detected" or "N persons are in here". If a person is identified to be included in the image, the control unit 100 identifies whether an error is generated by analyzing the person included in the image at operation 715. Here, if the camera device is excessively inclined (i.e., if not in the horizontal level), the control unit 100 may decide that an error is generated by analyzing an output of the sensor 160. If the error is generated, the control unit 100 detects it at operation 717, and displays an error warning corresponding to the type of generated error at operation 719. The error type may include a case in which a human subject must move and a case in which a photographer must move the camera device, and the error warning output for correcting the error state may be a voice. The above operations are continued as long as the error is generated. If a user's request for photographing is not detected in the state that the error is generated, the control unit 100 returns to operation 715 and repeats the above operations at operation 721. Namely, as long as the user does not request for photographing through the input unit 140 (e.g., manual capture request by tapping the shutter button or by tapping the screen anywhere), the control unit 100 indicates the error warning with a voice if an error is detected from a person included in the image.

After executing operation 719, if the error is addressed or another error is not generated at operation 717, the control unit 100 detects it at operation 721, indicates information of which persons in the image are located in a desired or acceptable photographing composition (e.g., N faces (or person) are perfect), and stores the corresponding image in the storage unit 110 at operation 723. The information displayed at operation 723 may be a voice, and the photographing of operation 721 may be performed according to a photographer's request for manual photographing.

A procedure of outputting an error warning corresponding to an error type detected in a person photographing according to an embodiment of the present disclosure will be described in more detail referring to FIG. 8. FIG. 8 illustrates a procedure of operations 715 to 719 of FIG. 7.

Referring to FIG. 8, the control unit 100 analyzes persons in a subject recognition area of the photographed image (i.e., extracts a face area) at operation 811. Errors in the portrait photographing may include a case in which a person is out of the subject recognition area, a case in which a face area of person is not detected, a case in which a person is not correctly focused, and a case in which a person has their eyes closed.

If a person (or face area) is out of the subject recognition area, the control unit 100 detects it at operation 813, and generates an error warning so that the location of camera is moved or a person moves at operation 815. For example, if the distances between persons are great, control unit 100 detects it at operation 813, and generates an error warning so that the distances between persons is reduced at operation 815. The method of generating the error warning may be performed with a voice warning (e.g., "Move closer.") so that all the persons move. Further, if the distances between specific persons are great, a voice warning may be generated to guide the specific persons to move. The control unit 100 may be installed with a face recognition engine, and in this case, information of a person currently being photographed may be identified by comparing recognized face information with pre-stored information of persons. Further, if the camera device is inclined more than a threshold value by analyzing an inclination of the camera device output by the sensor 160 (i.e., horizontal level is out of range), the control unit 100 generates an error warning so that the camera device is tilted to the left or right. In this case, a voice warning guiding a person to move (in a form of name+direction) may be generated (e.g., "Jane, move towards James."). If an image of a person in the subject is cut off, such as, in a case in which an upper part of face image is cut off, a case in which a lower part of face image is cut off, a case in which a left part of face image is cut off, a case in which a right part of face image is cut off, and a case in which the camera device is inclined in the right or left direction, the control unit 100 detects an error type at operation 813, and outputs an error warning (e.g., "Tilt up.", "Tilt down.", "Move left.", "Move right.", "Tilt left.", or "Tilt right.") and decides an error type correspondingly at operation 815.

If the face area in the subject recognition area is not correctly recognized, the control unit 100 detects it at operation 817, and outputs an error warning to guide a person to move the face at operation 819. Here, the error in detecting a face area may include a case in which the eyes, nose, and/or mouth are not recognized in the face area of a person because the person lowered his/her face. In this case, a side of the person (face) may be intentionally photographed. However, in the case in which a mouth, nose, and an eye are recognized, the photographing may be performed in a normal composition. If the face area is not correctly recognized like the above situation, the control unit 100 guides the person to move with an error warning (e.g., "Face is not detected.") and proceeds to photograph the face area.

Further, if a person is not focused when photographing a portrait (e.g., if any other object than a person is focused), the control unit 100 detects it at operation 821, and guides by outputting an error warning so that the person is correctly focused by moving the camera device toward the person at operation 823. If the person in the subject recognition area has their eyes closed, the control unit 100 detects it at operation 825, and outputs an error warning so that the person opens their eyes (e.g., "Eyes closed.") at operation 827. Similarly, if a plurality of persons exists in the subject recognition area and a specific person has their eyes closed, the control unit 100 recognizes the faces of persons and outputs an error warning so that the specific person opens eyes (e.g., "Jane closed eyes." or "Jane, Open eyes.") at operation 827.

If a number of persons in the subject recognition area has changed, the control unit 100 detects it at operation 831, and outputs an error warning indicating that the number of persons has changed at operation 833. If an error other than the above errors is generated, the control unit 100 detects it, and generates an error warning according to the type of generated error at operation 835.

FIGS. 9A and 9B are drawings illustrating examples of processing an error and error warning at operation 831. Namely, besides the above errors, a situation can be happen in which the error state cannot be corrected even though the location of the terminal is changed or the person moves. For example, when photographing a close-up portrait in a landscape mode, a partially cut off image of a person can be obtained as shown by 910 of FIG. 9A. In this case, it may be desirable to photograph the portrait by changing the display mode of the camera device as shown by 920 of FIG. 9A (i.e., by changing the direction of image sensor of the camera 120 from the horizontal direction to the vertical direction). Further, if a plurality of persons are photographed in a portrait mode, the rightmost or leftmost person can be cut off from the photographed image as shown by 930 of FIG. 9B unless the display mode is not changed. In this case, it may be desirable to photograph by changing the display mode of the camera device from the portrait mode to the landscape mode as shown by 940 of FIG. 9B (i.e., by changing the direction of image sensor of the camera 120 from the vertical direction to the horizontal direction).

As described above, a method for photographing a portrait in a camera device according to an embodiment of the present disclosure recognizes and extracts a face area of persons in a subject recognition area, and analyzes errors of extracted (i.e., recognized) persons. If an error is generated, the control unit indicates an error state with an audio (i.e., voice or sound) and/or video (color, picture, characters, etc.) information. Here, the audio and/or video error warning may be information explaining an error situation to the photographer as a feedback (including direction information for correcting the error situation). The error situation may be, as described above, a case in which the photographer is located in the same direction as the subject based on the camera device or a case in which the photographer is located in the same direction as the subject based on the subject. For example, when generating an error warning based on the camera device, the control unit 100 may generate an error warning "Tilt camera to the left." if the camera device is inclined to the right, and may generate an error warning "Step backwards." if the size of the face in the subject recognition area is too large. When generating an error warning based on the subject, the control unit 100 may generate an error warning "Come closer to camera." if the size of the face in the subject recognition area is too small, and may generate an error warning "Tilt face to the left." if the face of the subject person is inclined to the right. As described above, the error warning may include an error warning for moving the camera device and an error warning for moving the subject. The control unit 100 decides the error type according to a detected state of the camera device by using sensor information and a recognition result of a face area of persons detected from the subject recognition area, and generates an error warning for controlling the subject or the camera device according to the decided error type.

Further, a feedback of an error warning, such as direction guides of a camera device and/or subject and error situation, may be provided through a vibrator.

The camera device according to an embodiment of the present disclosure performs an error algorithm in a preview state if the camera 120 is activated after setting an auto-portrait mode or if the auto-portrait mode is set after activating the camera 120, and stores an image by automatically photographing or by photographing according to a user's input if no error is detected in the preview mode. However, if an error is detected from the photographed image by the error algorithm, the control unit 100 feeds back an error warning to the photographer according to the type of error, and performs a re-photographing mode at the same time. Accordingly, if the auto-portrait mode is switched on, the camera device identifies an image displayed in the camera device by using an error algorithm according to an embodiment of the present disclosure, generates an error warning according to the identified error type and feeds back to the photographer if the error is detected, and performs the re-photographing procedure. However, if no error is detected or the error is addressed according to the error warning, the control unit 100 may store an error-free image or an image photographed by a conventional procedure.

Figure 10:
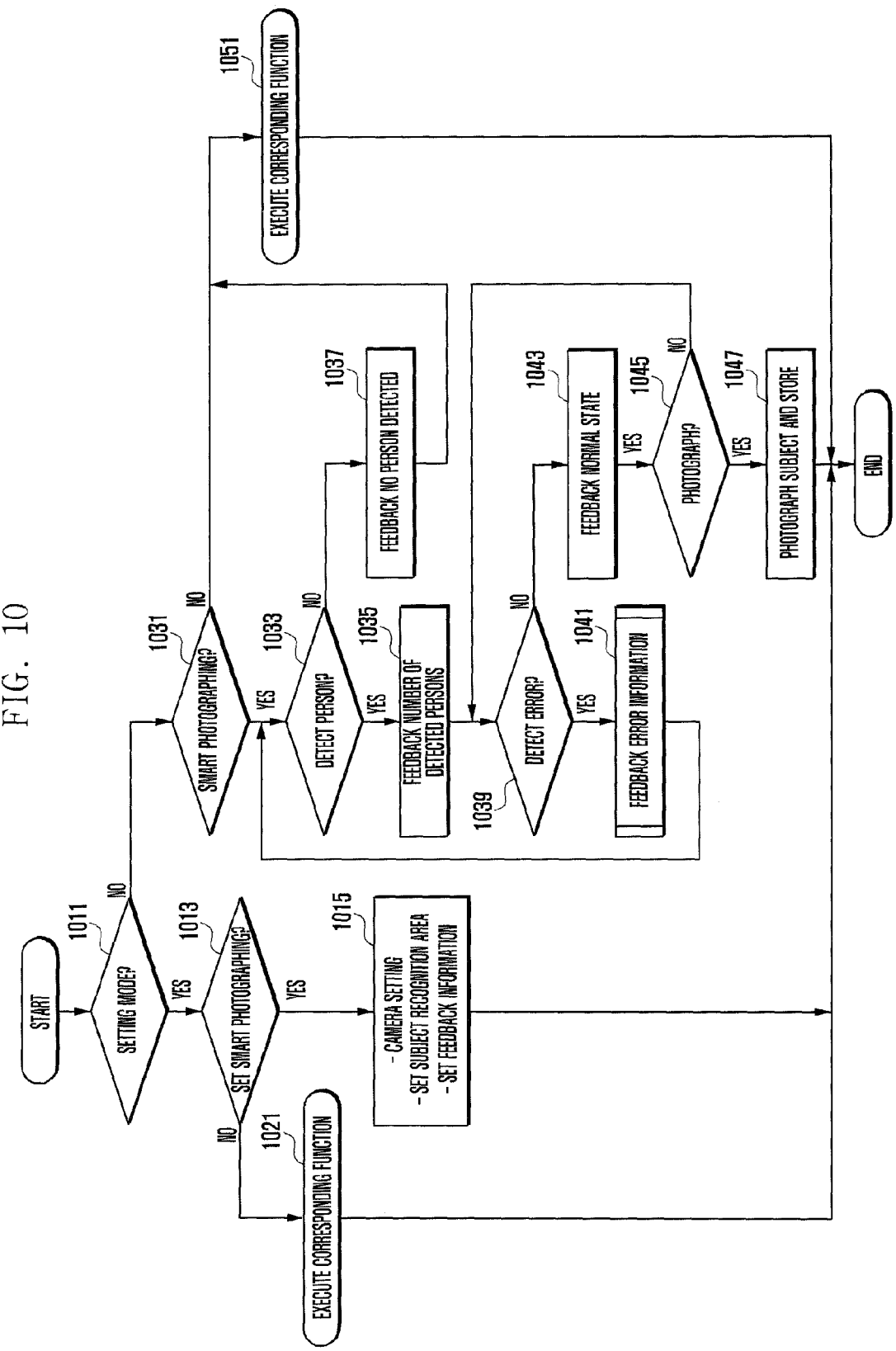
FIG. 10 is a flowchart illustrating a procedure of setting a photographing mode for a portrait and photographing the portrait in a camera device according to an embodiment of the present disclosure.
Figure 11:
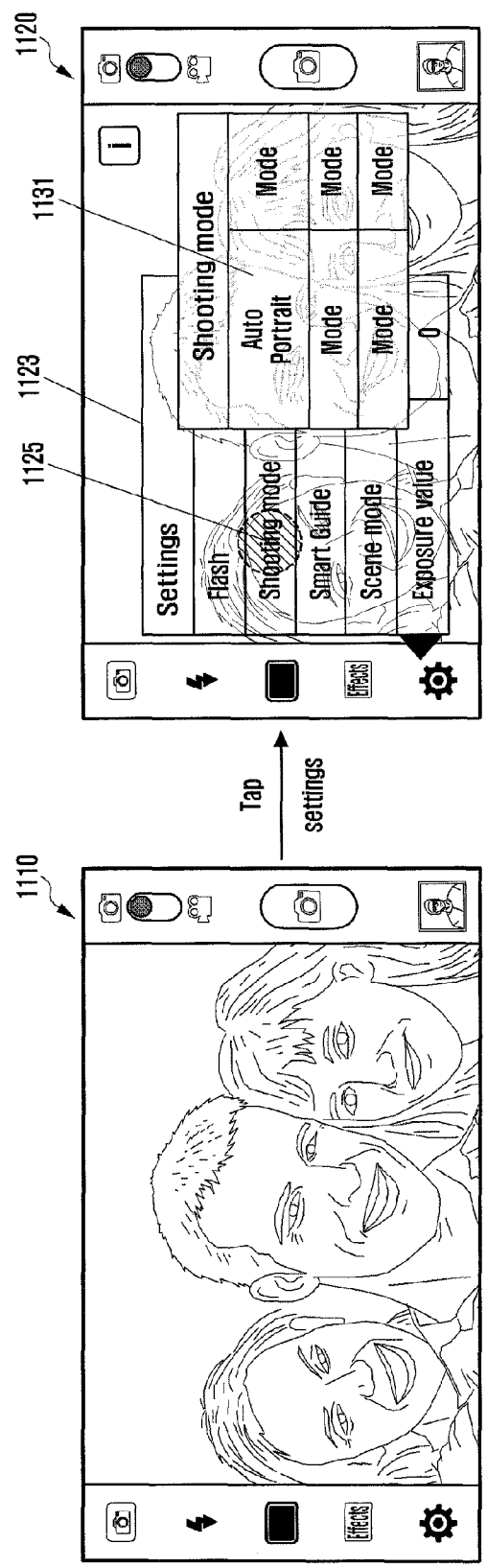
FIG. 11 is a drawing illustrating a menu in a settings menu according to an embodiment of the present disclosure.

FIG. 10 is a flowchart illustrating a procedure of setting a photographing mode for a portrait and photographing the portrait in a camera device according to an embodiment of the present disclosure. FIG. 11 is a drawing illustrating a menu in a settings menu according to an embodiment of the present disclosure.

Referring to FIG. 10, a user can set the auto-portrait mode according to an embodiment of the present disclosure before or after activation of the camera. FIG. 11 is a drawing illustrating an example of performing a setting mode in a state of activating the camera.

If the user selects a setting mode (i.e., settings) in a state of activating the camera as shown by 1110 of FIG. 11, the control unit 100 controls to display a setting menu as shown by 1123 of FIG. 11 at operation 1011. The setting menu 1123 includes a menu of a photographing mode (i.e., shooting mode) 1125 as shown by 1120 of FIG. 11, and if the photographing mode (shooting mode) 1125 is selected from the settings menu 1123, the control unit 100 controls the display unit 130 to display a sub-menu 1131 including an auto-portrait mode. Here, if it is determined that a setting operation is not requested at operation 1013, the control unit 100 executes a corresponding function at operation 1021. On the other hand, if the auto-portrait mode is selected, the control unit 100 identifies that the setting of auto-portrait mode is requested at operation 1013, and performs a setting operation of auto-portrait mode at operation 1015. The auto-portrait mode may be set or disabled in a toggle method, and the error warning may be switched on or off (i.e., guide on/off) in the auto-portrait mode. If the error warning function is switched on, a mode of outputting an error warning only with a voice or a mode of outputting the error warning with a voice and video can be set. Further, a person recognition area and subject recognition area may be set while setting the auto-portrait mode. The subject recognition area can be selected from predefined areas or may be set by the user through the input unit 140. In an embodiment of the present disclosure, it is assumed that a predetermined subject recognition area as default is used. The settings of auto-portrait mode may be performed in the methods listed in Table 1.

TABLE 1

| Settings | Toggle | Select in shooting mode of settings (toggle on/off) |
|---|---|---|
| | Guide off | Do not provide error warning |
| Guide on | only guide | Provide sound (voice) guide |
| Guide on | with video | Provide sound (voice) guide and visual guide |

If the camera is not driven in the state of setting the auto-portrait mode, the control unit 100 determines entry into a smart photographing mode according to an embodiment of the present disclosure at operation 1031. If the smart photographing mode is not selected, the control unit 100 executes a corresponding function at operation 1051. On the other hand, if the smart photographing mode is selected, the control unit 100 detects a person in the subject recognition area, and displays the number of persons at operations 1033 and 1035 or provides feedback at operation 1037. Subsequently, the control unit 100 determines if an error occurs regarding a person in the subject recognition area and generates an error warning according to the error type at operations 1039 and 1041. If the error is addressed or another error is not detected in a preview image, the control unit 100 detects it at operation 1039, indicates that persons in the subject recognition area are normally located at operation 1043, and stores an image photographed by the camera 120 in the storage unit 110 at operations 1045 and 1047. Here, the image can be automatically stored if an error is not detected for a threshold time or manually stored according to a user's request.

Figure 12:
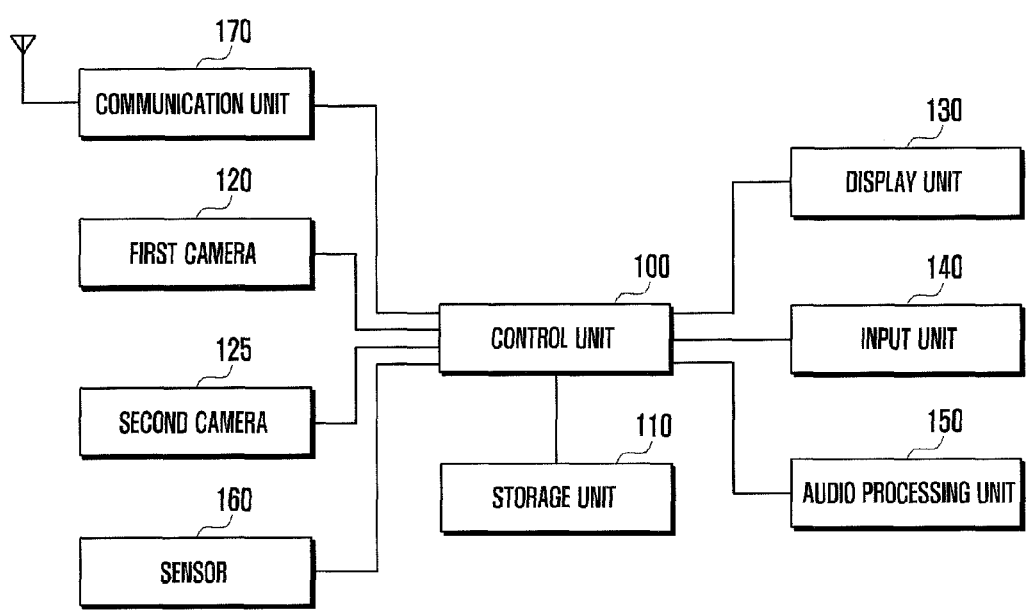
FIG. 12 is a block diagram illustrating a configuration of portable terminal performing a photographing operation according to an embodiment of the present disclosure.

FIG. 12 is a block diagram illustrating a configuration of portable terminal performing a photographing operation according to an embodiment of the present disclosure. Here, the portable terminal may be a mobile phone including a smart phone, an MP3 terminal, a tablet PC, or any digital equipment having a camera.

Referring to FIG. 12, a communication unit 170 performs a communication function with a base station or internet server. The communication unit 170 may be configured with a transmitter for up-converting a frequency of a transmitting signal and for amplifying power, and a receiver for low-noise amplifying and down-converting a frequency of a receiving signal. Further, the communication unit 170 may include a modulator and a demodulator. The modulator transmits a transmitting signal to the transmitter by modulating the signal, and the demodulator demodulates a signal received through the receiver. Here, the modulator and demodulator may use any of various communication standards such as LTE, WCDMA, GSM, WIFI, WIBRO, NFC, or Bluetooth. In an embodiment of the present disclosure, the communication unit 170 is assumed to be configured with an LTE, WIFI, and Bluetooth devices.

A first camera 120 is a camera disposed at the rear side of the portable terminal, and may photograph a high resolution image. A second camera 125 is a camera disposed at the front side of the portable terminal, and may photograph a lower resolution image as compared to the first camera. In an embodiment of the present disclosure, an auto-portrait mode may be set when photographing a self-portrait by using the first camera 120 or when photographing a subject without looking at the display unit 130.

The control unit 100 controls the general operation of the portable terminal, and controls the first camera 120 and/or second camera 125 in the auto-portrait mode when photographing according to an embodiment of the present disclosure. Namely, the control unit 100 detects persons in the subject recognition area of an image photographed by the first camera 120 or the second camera 125 in the auto-portrait mode, identifies an error generation by analyzing the detected persons, and outputs an error warning corresponding to an error type if an error is generated. If the error situation is removed and a portrait can be photographed normally, the control unit 100 controls to store a corresponding image automatically or manually.

A storage unit 110 may include a program memory configured to store an operating program of the portable terminal and a program according to an embodiment of the present disclosure, and a data memory configured to store tables for the operation of portable terminal and data generated while executing a program. In an embodiment of the present disclosure, the control unit 100 stores error warnings corresponding to error types as described above, and the error warning may be stored as audio and/or video data.

A display unit 130 displays information of an executing application under the control of the control unit 100. The display unit 130 may be configured with an LCD, an OLED, and the like. An input unit 140 may be provided as a capacitive type or a resistive type, and outputs location information of a user's touch (i.e., finger touch) to the control unit 100. Further, the input unit 140 may include an ElectroMagnetic Resonance (EMR) sensor pad, and detects a pen touch input to transmit to the control unit 100. Here, the display unit 130 and the input unit 140 may be integrated into one unit.

An audio processing unit 150 outputs an error warning corresponding to a detected error type with an audio signal of voice and/or sound. A sensor 160 includes various sensors to detect a movement of the portable terminal. The sensor 160 detects the movement of the portable terminal, and the control unit 100 determines the distance between the terminal and the user by analyzing an output of the sensor 160. Here, the sensor may be configured with an acceleration sensor, a geomagnetic sensor, a location detecting sensor, and the like. The sensor 160 detects an inclination of the portable terminal in the auto-portrait mode and outputs to the control unit 100. The control unit 100 controls to output an error warning by analyzing the detected inclination if the horizontal level of a photographed image is outside of a threshold value.

The portable terminal having the configuration of FIG. 12 according to an embodiment of the present disclosure is configured with a rear camera 120 and a front camera 125 for photographing an image. The user may take a self-portrait by using the front camera 125 or the rear camera 120. When photographing an image by using the front camera 125, the image being photographed can be identified through the display unit 130. However when photographing an image by using the rear camera 120, the image being photographed cannot be identified. Accordingly, when photographing a self-portrait by using the rear camera 120, if the user sets the auto-portrait mode in the setting mode as shown in FIG. 11 and drives the rear camera 120, the control unit 100 analyzes persons in an image being photographed as shown in FIGS. 2, 5, and 8 and identifies whether an error is generated. If an error is generated, the control unit 100 outputs an error warning corresponding to an error type (i.e., information for removing an error situation) to guide movements of the terminal and/or human subject. If the error situation is removed, the control unit 100 detects it and stores an image photographed by the camera 120 in the storage unit 110.

When photographing a self-portrait by using the rear the camera 120 to obtain a high resolution image in the portable terminal having a camera, the photographer can identify a photographing composition through an audio error warning without looking at a display image being photographed by the camera 120, and thereby can obtain a portrait in a desired photographing composition. Further, when photographing a subject without looking at the display unit 130, the photographer may use it as an accessibility dedicated camera application which helps to photograph with side accessibility. Particularly when photographing a self-portrait, a guide is provided to the user, and thereby the user can take a photo according to the guide. Therefore, even though a subject is positioned out of the guide, a desired photo can be obtained by correcting the errors.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for photographing a portrait in an apparatus having a camera, the method comprising:
　　setting the apparatus in a photographing mode in response to a turn-over operation being detected by the apparatus;
　　detecting a person in an image obtained by the camera in the photographing mode;

determining an occurrence of an error by identifying whether the detected person is located in a subject recognition area that is automatically set based on a type of the photographing mode;

generating an error warning including direction information directing the person to move into the subject recognition area if at least a portion of the person is determined to be out of the subject recognition area based on the determining of the occurrence of the error; and storing an image output by the camera if the person is determined to be located in the subject recognition area based on the determining of the occurrence of the error.

2. The method of claim 1,
wherein the photographing mode comprises a portrait photographing mode outputting a voice as the error warning, which is set according to an error type in a setting mode, and
wherein the portrait photographing mode is set before or after an activation of the camera to obtain the image.

3. The method of claim 2, wherein the generating of the error warning comprises:
analyzing the error type regarding the person in the subject recognition area; and
generating the error warning by guiding the error warning with the voice corresponding to the error type.

4. The method of claim 3,
wherein the error type includes at least one of:
the person being out of the subject recognition area in an upward direction,
the person being out of the subject recognition area in a downward direction,
the person being out of the subject recognition area in a leftward direction, and
the person being out of the subject recognition area in a rightward direction, and
wherein the generating of the error warning comprises generating a voice error warning including the direction information directing the person to move in an appropriate direction so as to be located in the subject recognition area, the direction information corresponding to the error type.

5. The method of claim 3,
wherein the error type comprises an error in which the person is located too far from the subject recognition area, and
wherein the generating of the error warning generates a voice error warning including the direction information directing the person to reduce a distance between the person and the apparatus.

6. The method of claim 3,
wherein the determining of the occurrence of the error further comprises determining a horizontal level of the apparatus through a sensor, and
wherein the generating of the error warning comprises generating a voice error warning including the direction information directing the camera to adjust a level of the apparatus so that the apparatus maintains a horizontal state, if the horizontal level of the apparatus is inclined.

7. The method of claim 3,
wherein the error type comprises an error in which a face area of the person is not detected in the subject recognition area, and
wherein the generating of the error warning comprises generating a voice error warning indicating that the face area is not detected according to the error type.

8. The method of claim 3,
wherein the error type comprises an error in which eyes of the person in the subject recognition area are closed, and
wherein the generating of the error warning comprises generating a voice error warning indicating that the eyes of the person are closed according to the error type.

9. The method of claim 3, wherein the detecting of the person in the image further comprises outputting a voice indicating a number of detected persons.

10. An apparatus having a camera, the apparatus comprising:
a display unit disposed on a side of the camera and configured to display an image photographed by the camera;
a storage unit configured to:
store error warnings corresponding to error types, and
store photographed images; and
a control unit configured to:
set the apparatus in a photographing mode in response to a turn-over operation being detected by the apparatus;
detect a person in an image obtained by the camera in the photographing mode;
determine an occurrence of an error by identifying whether the person is located in a subject recognition area of the image output by the camera in the photographing mode, the subject recognition area being automatically set based on a type of the photographing mode,
generate an error warning including direction information directing the person to move into the subject recognition area if at least a portion of the person is determined to not be located in the subject recognition area based on the determined occurrence of the error, and
store the image output by the camera if the person is determined to be located in the subject recognition area based on the determined occurrence of the error.

11. The apparatus of claim 10,
wherein the storage unit is further configured to store voice error warnings, and
wherein the control unit is further configured to set a portrait photographing mode generating a voice error warning from the error warning in a setting mode.

12. The apparatus of claim 11, wherein the control unit is configured to:
determine an error type of the person in the subject recognition area of the image obtained by the camera, and
output a voice error warning stored in the storage unit corresponding to the error type as a voice.

13. The apparatus of claim 12, wherein the control unit is further configured to:
determine the error type by identifying whether the person is out of the subject recognition area in at least one of an upward direction, a downward direction, a leftward direction, and a rightward direction, and
generate the voice error warning including the direction information directing the person to move in an appropriate direction so as to be located in the subject recognition area, the direction information corresponding to the determined error type.

14. The apparatus of claim 13, further comprising:
a sensor configured to detect a horizontal level of the apparatus,
wherein the control unit is further configured to generate the voice error warning including the direction information by analyzing the output of the sensor and directing the apparatus to adjust a level of the apparatus so that the apparatus maintains a horizontal state, if the horizontal level of the apparatus is inclined.

15. The apparatus of claim 14,
wherein the apparatus comprises a portable terminal, and
wherein the portrait photographing mode is set in an auto-portrait mode.

16. An apparatus comprising:
a camera disposed on a first side of the apparatus and configured to operate in a photographing mode and capture an image;
a display unit disposed on a second side of the apparatus, opposite the first side, and configured to display the image captured by the camera;
a storage unit configured to:
    store error warnings corresponding to error types, and
    store the image captured by the camera; and
a control unit configured to:
    set the apparatus in a photographing mode in response to a turn-over operation being detected by the apparatus;
    detect a person in the image captured by the camera in the photographing mode;
    determine an occurrence of an error by identifying whether the person is located in a subject recognition area of the image captured by the camera when the camera operates in the photographing mode, the subject recognition area being automatically set based on a type of the photographing mode,
    generate an error warning when the person is not located in the subject recognition area, and
    automatically control storing of the image captured by the camera when the person is located in the subject recognition area.

17. The apparatus of claim 16, wherein the storage unit is further configured to store voice error warnings.

18. The apparatus of claim 17, wherein the control unit is further configured to:
    determine an error type regarding the person in the subject recognition area, and
    output a voice error warning stored in the storage unit corresponding to the determined error type as a voice.

19. The apparatus of claim 18, wherein the control unit is further configured to:
    determine the error type by identifying whether the person is out of the subject recognition area in at least one of an upward direction, a downward direction, a leftward direction, and a rightward direction, and
    generate the voice error warning including direction information directing the person to move in an appropriate direction so as to be located in the subject recognition area corresponding to the determined error type.

20. The apparatus of claim 19, further comprising:
a sensor configured to detect a horizontal level of the apparatus,
wherein the control unit is further configured to generate the voice error warning including the direction information by analyzing the output of the sensor and directing the apparatus to adjust a level of the apparatus so that the apparatus maintains a horizontal state.

* * * * *